Figure 1:
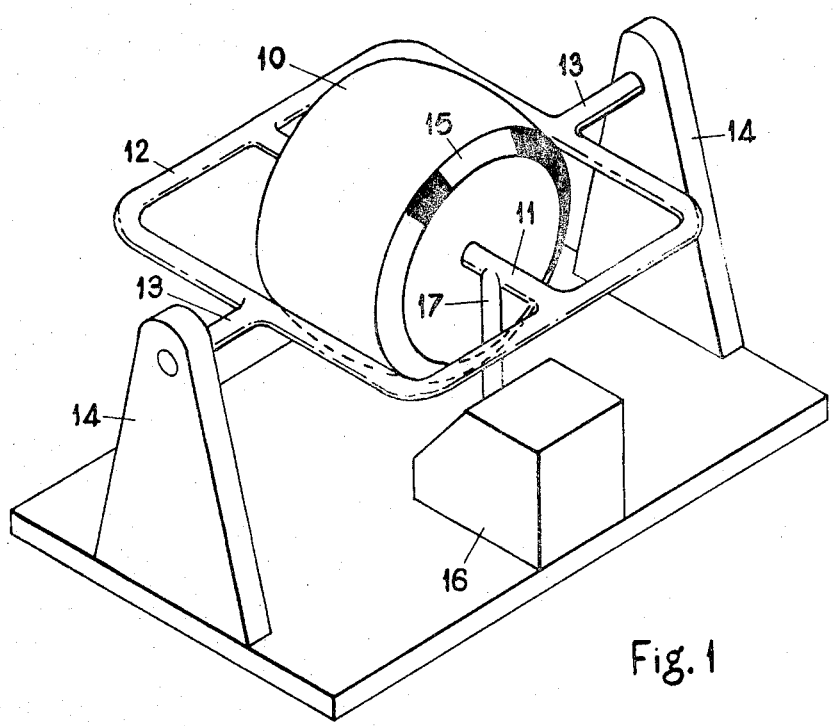

United States Patent [19]
Catford et al.

[11] 3,732,739
[45] May 15, 1973

[54] MONITORING OF GYROSCOPE ROTATION

[75] Inventors: John Russell Catford, Sittingbourne; James Brotton, Chatham, both of England

[73] Assignee: Elliott Brothers (London) Limited, London, England

[22] Filed: July 21, 1971

[21] Appl. No.: 164,604

[30] Foreign Application Priority Data

July 21, 1970  Great Britain.....................35,254/70

[52] U.S. Cl.....................................74/5.6, 250/233
[51] Int. Cl. .............................................G01c 19/28
[58] Field of Search .....................74/5, 5.6; 250/215, 250/233, 236; 33/1 PT

[56] References Cited

UNITED STATES PATENTS

| 3,239,673 | 3/1966 | Unruh | 250/233 X |
| 3,323,378 | 6/1967 | Powell | 74/5.6 |
| 3,567,945 | 3/1971 | Appleby | 250/233 X |
| 3,205,718 | 9/1965 | Wierenga et al. | 74/5.6 X |
| 2,856,778 | 10/1958 | Kiebert, Jr. | 74/5.6 |
| 3,373,616 | 3/1968 | Dugay | 74/5.6 |

*Primary Examiner*—Manuel Antonakas
*Attorney*—Kirschstein, Kirschstein, Ottinger & Frank

[57] ABSTRACT

A gyroscope system including an arrangement for monitoring the rotation of the gyroscope rotor comprising sensing means which produces an output signal corresponding to an optically coded band on the rotor. The sensing means is suitably a light-sensitive device responsive to light reflected from the coded band.

3 Claims, 3 Drawing Figures

MONITORING OF GYROSCOPE ROTATION

This invention relates to the monitoring of gyroscope rotation.

It has been proposed to monitor the rotation of a gyroscope by mounting a magnet on the gyroscope rotor and a sensing head on the frame, so that pulses are induced in the sensing head as the rotor rotates. It is also possible to arrange for the direction of rotation to be detectable by variations in the output waveform from the sensing head, and for precession of the rotor to be detectable by variations in the output amplitude from the head. However, various practical difficulties arise in implementing this technique, and it is therefore the object of the present invention to provide a novel technique for monitoring gyroscope rotation.

Accordingly, the present invention provides a gyroscope system in which the rotor has an optically coded band on it, this band being sensed by sensing means whose output is processed to determine the condition of the gyroscope.

In a preferred arrangement in accordance with the invention the coded band comprises a band around the rotor having at least one light reflective area and at least one substantially non-reflective area, and the sensing means includes a light-sensitive device which receives light reflected from the coded band.

In one particular such arrangement the sensing means includes a light source which shines through a collimating tube onto the coded band, two collimating slits one mounted on the rotor gimbal and the other fixed and normally aligned with each other, and the light-sensitive device is aligned with the slits. In normal operation, light from the source will pass through the collimating tube, be reflected from the coded band, and pass through the two aligned slits onto the light-sensitive device. Precession of the rotor by more than a small amount will move the slit mounted on the rotor gimbal out of alignment with the fixed slit, and the output of the light-sensitive device will therefore go to a steady "dark" level. The coding on the band may conveniently be such that the output of the sensing means when the rotor is rotating in the normal direction is a long pulse followed by a short pulse, the delay between each short pulse and the preceding long pulse being shorter than the delay between each long pulse and the preceding short pulse.

This waveform can be processed by using the sensing means output to form narrow pulses from the leading edges of its pulses, and also to drive a capacitor integrating circuit whose output gates the narrow pulses.

In the present specification the term 'light' is intended to include any electromagnetic radiation which can be reflected at a surface and is not limited to visible light.

Figure 3:
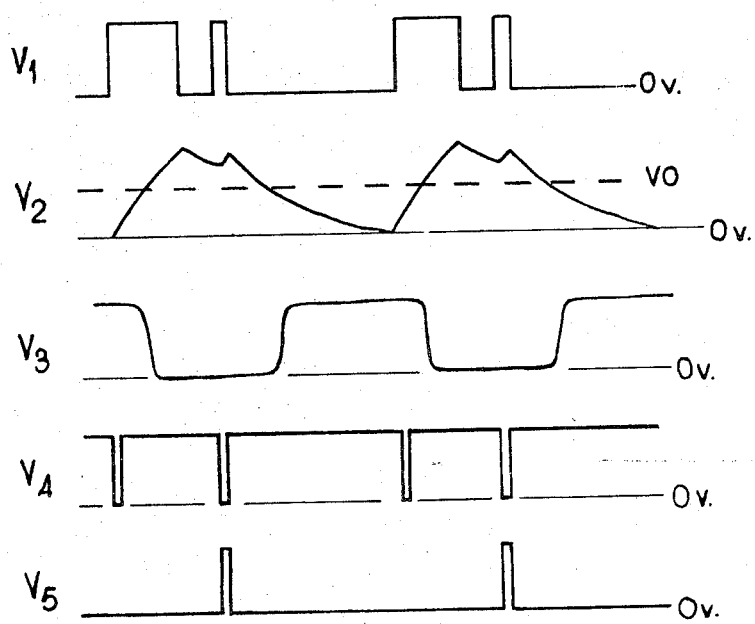
Figure 2:
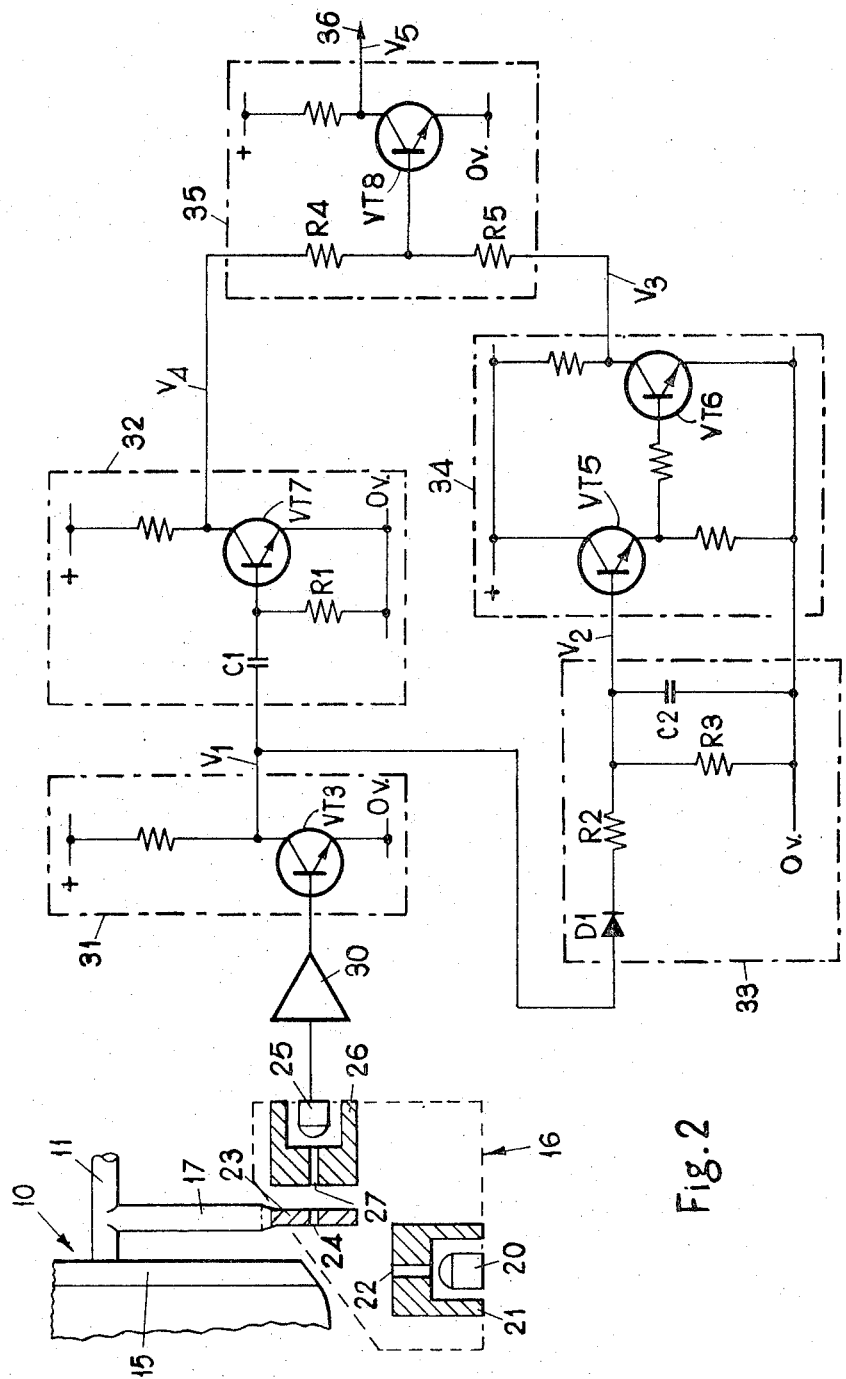

An embodiment of the invention will now be described, by way of example, with reference to the accompanying drawings in which:

FIG. 1 is a simplified perspective view of a gyroscope;
FIG. 2 is a circuit diagram of the system; and
FIG. 3 is a set of waveforms associated with the circuit of FIG. 2.

Referring to FIG. 1, a rotor 10 is freely rotatable on a spindle 11 which is fixed to a rectangular frame 12. The fame 12 is fixed to a shaft 13 which is mounted in supports 14. The rotor is driven by an electric motor (not shown), and the shaft 13 carries means (not shown) for sensing and controlling precession of the rotor.

The rotor 10 has formed on it a band 15 which is reflective over most of its length, but has two matt sections which are non-reflective, as shown. A sensing device 16 is mounted so as to sense the code band 15 in conjunction with a slit (not visible in FIG. 1) mounted on the rotor gimbal, e.g. by means diagrammatically shown as an arm 17 fixed to the shaft 11. The non-reflective sections are of 90° and 10° length, and are separated by a 45° length of reflective band, the normal direction of rotation is such that the longer (90°) non-reflective section passes the sensing device first, then the 45° reflective section, then the shorter (10°) non-reflective section, and finally the long remaining reflective section (215°).

Referring now to FIG. 2, the sensing device 16 is shown in section to comprise a lamp 20 with its casing 21 and a photosensitive device 25 with its casing 26. The lamp 20 may be a gallium arsenide light-emitting diode. The lamp casing 21 has a hole 22 of 0.8 mm diameter drilled through it, to define a collimated beam of light which shines on the code band 15. The arm 17 carries a shutter 23 with a slit 24 of 0.1 mm width formed in it. The light reflected from the code band 15 is therefore confined to a very narrow beam by this slit. The photosensitive device casing 26 has a slit 27 of 0.1 mm width formed in it, parallel to the slit 24, so that the beam emerging from slit 24 passes through slit 27 to the photosensitive device 25 only when the slits are aligned. Precession of the rotor by more than a small amount, e.g. 0.5°, will carry the slits out of alignment and cut off the light to the photosensitive device.

The output of the photosensitive device 25 is fed to a circuit in which, in normal operation, the waveforms of FIG. 3 appear at the appropriately referenced points. Photosensitive device 25 feeds a saturating amplifier 30 which feeds an inverter 31 which includes a transistor VT3. The output $V_1$ from inverter 31 consists of a long pulse, corresponding to the 90° non-reflective section of code band 15, closely followed by a short pulse, corresponding to the 10° non-reflective segment, for each revolution of the rotor. This signal is fed to a pulse forming circuit 32, which includes a differentiating circuit of capacitor C1 and resistor R1 and a transistor VT7. The differentiating circuit produces pulses at the edges of the waveform $V_1$, and transistor VT7 inverts and squares the positive pulses corresponding to the leading edges of the pulses in waveform $V_1$ to give signal $V_4$. The width of the pulses of this signal is determined by the values of C1 and R1.

Signal $V_1$ is also fed to an integrating circuit 33, in which a capacitor C2 is driven by a diode pump (diode D1 and resistor R2) and discharges through a resistor R3. The output signal $V_2$ from this circuit 33 therefore rises steadily from zero during the long pulse of waveform $V_1$ and then falls gradually back to zero again, with a slight rise again during the short pulse. This signal $V_2$ is fed to a squaring circuit 34 which is set to operate at the voltage level VO shown on waveform $V_2$. Transistors VT5 and VT6 together define the operating level VO. Transistor VT5 acts as a voltage following buffer, and transistor VT6 squares and inverts the output from transistor VT5, producing output signal $V_3$.

The outputs $V_3$ and $V_4$ from circuits 32 and 34 are combined in a gate 35 by resistors R4 and R5. Transistor VT8 transmits (and inverts) the pulses from the pulse forming circuit 32 provided that signal $V_3$ is zero. Thus the pulses of waveform $V_4$ corresponding to the leading edges of the long pulses in waveform $V_1$ are blocked, but the pulses corresponding to the leading edges of the short pulses of waveform $V_1$ pass through to give output signal $V_5$ on the final output line 36.

It will be evident that if the rotor rotates in the opposite (wrong) direction, the short pulses of waveform $V_1$ will precede, instead of following, the long pulses. The voltage on capacitor C2 will therefore be substantially zero at the beginning of the short pulse of waveform $V_1$, and will not have risen appreciably by the beginning of the long pulse. Thus waveform $V_3$ will be at the positive level at the beginning of both pulses of waveform $V_1$, and there will therefore be no pulses from the pulse forming circuit 32 transmitted through the gate 35.

Thus correct operation is indicated by a train of positive pulses at the appropriate frequency on the output line 36. If the rotor rotates in the wrong direction, fails to rotate, or moves more than ± 0.5° from its correct position, the train of pulses disappears.

We claim:

1. A gyroscope system comprising:
   A. a rotor having a gimbal and a normal axis of spin;
   B. an optically coded band extending around the rotor and having
      i. at least one light reflective area and
      ii. at least one substantially non-reflective area;
   C. a light source;
   D. a collimating means for directing light from said source onto the coded band;
   E. a light sensing means positioned to receive light reflected from the coded band and produce from the light energy received an output electric signal corresponding to the coding on said band;
   F. an electric circuit means for processing said signal to determine the condition of the gyroscope; and
   G. a pair of collimating slits positioned between the coded band and the light sensing means,
      i. one slit being fixed with respect to the light sensing means and
      ii. the other slit being mounted on the gimbal,
      iii. the slits being aligned to allow the light sensing means to receive light reflected from the coded band only when the rotor is rotating about its normal axis of spin.

2. A gyroscope system according to claim 1
   A. wherein the coding on the band is such that the output of the sensing means when the rotor is rotating in the normal direction is a long pulse followed by a short pulse, the delay between each short pulse and the preceding long pulse being shorter than the delay between each long pulse and the preceding short pulse;
   B. and wherein said circuit means comprises:
      i. differentiating means;
      ii. means for supplying the output of the sensing means to the differentiating means to produce at the output of the differentiating means narrow pulses corresponding to the leading edges of the pulses in the sensing means output;
      iii. integrating means;
      iv. means for applying the output of the sensing means to the integrating means;
      v. gating means connected with the outputs of said differentiating means and integrating means to provide at the output of the gating means a signal indicative of the condition of the gyroscope.

3. A circuit according to claim 2 wherein the gating means passes only the narrow pulses corresponding to the leading edges of the shorter pulses when the rotor is rotating in the normal direction, and blocks all the narrow pulses when the rotor is rotating in the opposite direction.

* * * * *